Sept. 26, 1967    P. M. UNTERWEISER    3,343,643
TYPEWRITER INDICATING DEVICE
Filed Oct. 15, 1964    2 Sheets-Sheet 1

INVENTOR.
PAUL M. UNTERWEISER

ATTORNEYS

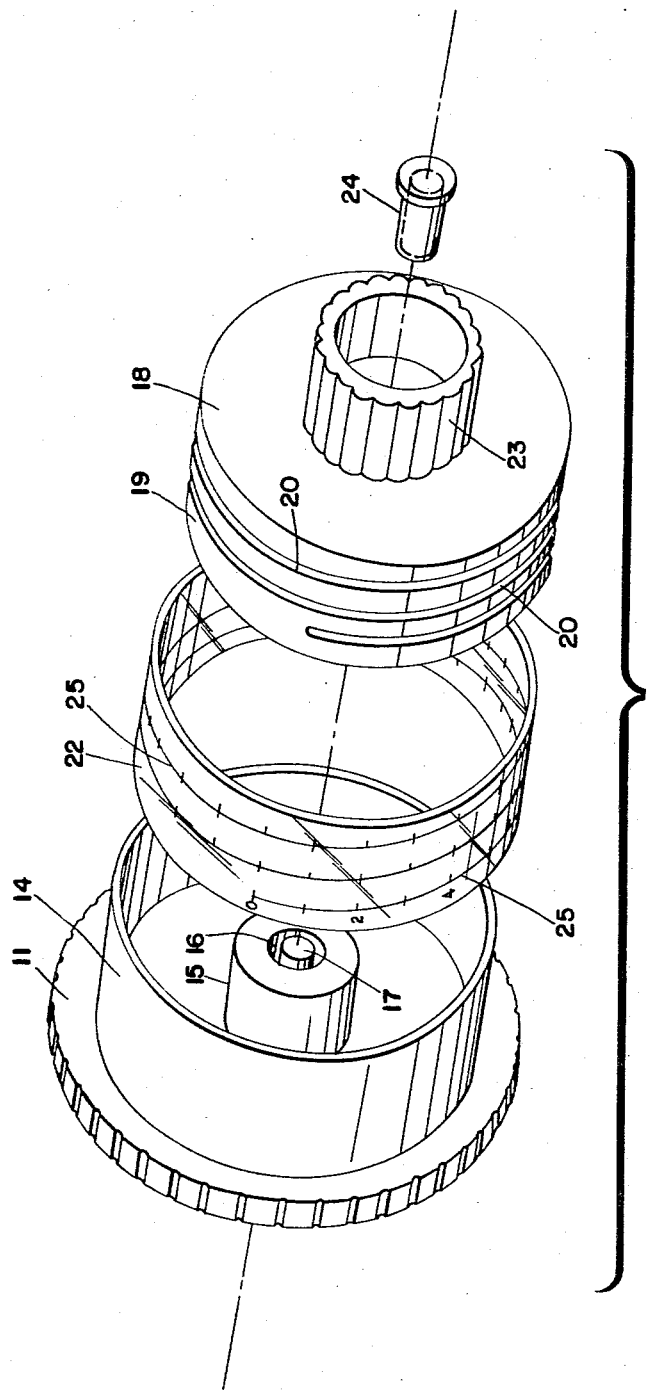

United States Patent Office 3,343,643
Patented Sept. 26, 1967

3,343,643
TYPEWRITER INDICATING DEVICE
Paul M. Unterweiser, Bainbridge Township, Ohio, assignor to Rotocator Corporation, Bainbridge Township, Ohio
Filed Oct. 15, 1964, Ser. No. 404,019
5 Claims. (Cl. 197—189)

This invention relates to an indicator device for a typewriter and, more particularly, to a device for indicating the progression or length of travel of a page through a typewriter.

Various devices have been employed for indicating the progression of a sheet of paper through a typewriter. These devices have not been generally accepted as attachments for typewriters, since they are excessively complex in design and construction, or because they are difficult to read in terms of accuracy, convenience, or both.

One such device is shown in the patent to Hassell, No. 2,505,769. The Hassell patent discloses a device which may be attached to the platen of a conventional typewriter. The device includes an indicator ball which is free to move in a spiral track upon rotation of the typewriter platen. A transparent casing is provided around the track to retain the indicator ball and a scale is printed upon this casing. The typist determines her position on the page by noting which indicia on the scale line up with the top of the indicator ball. Since the top of the ball is spaced away from the portion of the scale being read, however, parallax prevents an accurate reading of the scale. In order to determine the number of lines that have been typed, the typist must closely inspect the scale to line up the indicating ball with the proper indicia.

Another device for indicating the progression of paper through a typewriter is set forth in the applicant's prior Patent No. 2,633,969. In that patent a weighted indicating device indicates the progression of a page through a typewriter. The weighted indicator is mounted within a transparent cylinder and has a pointer which points toward the typist at substantially eye level. A scale is printed on the surface of the transparent cylinder and the pointer indicates the degree of progression of the paper. While this arrangement solves the problems of parallax, the typist must distinguish from among the several turns of the helical scale to determine the applicable line count. For example, at a given point in the progression of the paper, the indicator will point to three numbers (e.g., 2, 7, and 12), only one of which is applicable.

It is an object of the present invention to overcome these prior art problems.

It is a more particular object of the present invention to provide a mechanically simple device for indicating the progression of paper through a typewriter which is easily readable at eye level so that the typist may determine the exact position of the paper by glancing at the indicating device without altering her normal sitting position at the typewriter.

It is a further object of this invention to provide an indicating device having a flowable indicator that is positioned close to the scale, that will follow a single scale, and that will provide a direct reading.

These and other objects of the invention will become apparent and more readily be understood from the following detailed description of the invention and from the accompanying drawings.

In the drawings:
FIGURE 1 is an elevational view of an indicating mechanism according to the present invention.

FIGURE 2 is an exploded view of the device illustrated in FIGURE 1.

Figure 1:
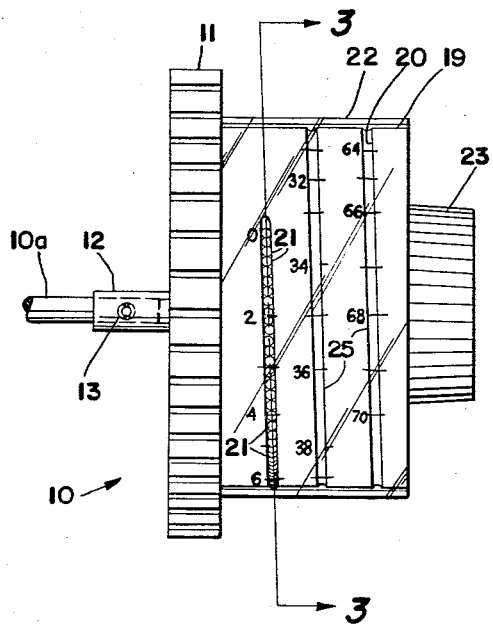

Referring now to the drawings, a progression indicator 10 is illustrated. The indicator 10 comprises a knob portion 11 which is attached to a platen shaft 10a of a conventional typewriter in place of the conventional knurled knob. The knob portion 11 is attached to the platen shaft 10a by a ferrule 12 which is slipped over the platen shaft and is securely held thereto by a setscrew 13. The ferrule 12 is in coaxial alignment with the axis of the portion 11 and is securely bonded to the portion 11 as, for example, by being molded integrally therewith. An outer thin-walled cylinder 14 extends axially outwardly from the portion 11. A second cylinder 15 extends axially outwardly from the portion 11 within the thin-walled cylinder 14 and is provided with an axial bore 16. A solid end portion 17 of the ferrule 12 extends through the bore 16 and is spaced from its sidewalls.

The device 10 further includes a member 18 which may be hollow and cup-shaped with an inner surface which is slipped over and is held in frictional engagement with the thin-walled cylinder 14. The member 18 may have a cylindrical, outer surface 19 which is provided with a spiral or helical groove or track 20. A multiplicity of beads 21 are retained in the track 20 by a hollow cylinder 22, which is slipped over and frictionally engages the surface 19.

The beads 21 are preferably stainless steel spheres which have been smoothly polished for minimum frictional drag relative to the track 20. Sufficient beads 21 are placed in the track 20 so that they follow a spiral or helical path that extends approximately two-thirds around the periphery of the surface 19. The beads 21 may be inserted in the track 20 by sliding the cylinder 22 axially so that a portion of the track 20 is uncovered so that the beads may be inserted into the uncovered portion of the track and will roll into the covered portion.

The member 18 is provided with a knob 23 so that the member 18 may be rotated relative to the thin-walled cylinder 14 for a purpose which will hereinafter become apparent. A capped sleeve 24 tightly engages the projecting end portion 17 of the ferrule 12 to restrain the member 18 against axial movement. The outer surface of the sleeve 24 frictionally engages the bore 16 in the cylinder 15.

The transparent cylinder 22 is preferably made of plastic and is provided with a scale 25 which is heat-impressed into its outer surface. The scale may be marked in picas or other appropriate units of measurement, beginning at zero and progressing along a spiral track which is imprinted over the track 20 to the number 84, which in picas is equivalent to 14 inches for three revolutions of the typewriter platen.

Figure 3:
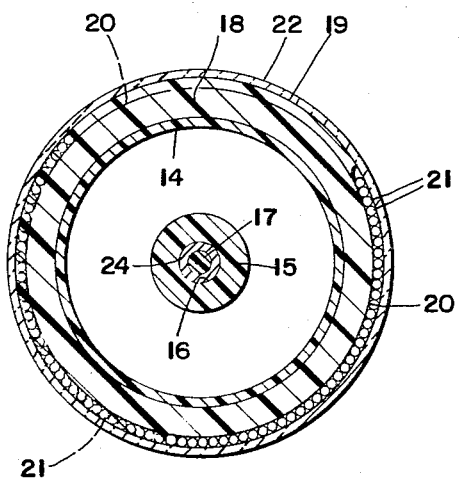
FIGURE 3 is a cross-sectional view of the device, the plane of the section being indicated by the line 3—3 in FIGURE 1.

As may be seen in FIGURE 1, the transparent cylinder 22 is positioned on the surface 19 so that the zero marking is in line with one end of the track 20. To operate the device, the typist inserts a sheet of paper into the typewriter and when she reaches a predetermined position on the page (i.e., the position at which the paper edge first appears above the platen), she sets the device 10 at a zero position by turning the knob 23 until the beads gently touch the end of the track 20. It may be desirable, however, to position the cylinder 22 on the surface 19 so that the zero marking is not at the very end of the track but is in close proximity thereto, as shown in FIGURE 1. In either case, however, the topmost bead on the track would be aligned with the zero marking. As the typing progresses, the knob portion 11 of the device 10 is turned to rotate the platen for proper spacing between the typed lines. The beads 21 remain at the same level indicated in FIGURES 1 and 3, but move axially outwardly to follow the track 20. The typist may tell at a glance how far the paper has progressed through the platen by noting the position of the scale relative to the top bead. Although the scale is illustrated as being marked in picas, the typist may easily convert to inches since six picas equal one inch. Of course, the scale may be printed in inches rather than picas, or both picas and inches, or in other appropriate units of measurement.

The device 10 is preferably molded from transparent plastic and the surface 19 is preferably colored so that the beads 21 clearly contrast with the track 20. It should be appreciated that this invention is not limited to the use of beads, but contemplates the provision of any flowable substance in a helical passage corresponding to the track 20. For example, a liquid may be placed in a helical passage that is carried by (or constitutes part of) a member corresponding to the member 18.

Since, as pointed out above, various modifications may be made within the scope of the invention, the invention is not intended to be limited to the slavish imitation of the particular structure described in detail herein, except as may be required by the appended claims.

What is claimed is:

1. A device for indicating the progression of a sheet of paper around a platen comprising means defining a closed helical track carried by and normally rotating with said platen, a flowable substance confined and retained by said track defining means in a portion of said track and visible from the exterior of the device, said flowable substance in said track filling more than 180 degrees of the annular extent of said track, and a scale on said device adjacent said track indicating the angular progression of said track relative to said flowable substance and, therefore, the progression of a sheet of paper around said platen.

2. The device according to claim 1 in which said helical track is rotatable relative to the platen when the helical track is rotated and the platen is constrained.

3. The device according to claim 1 wherein said flowable substance comprises a train of spherical beads.

4. The device according to claim 1 wherein said flowable substance comprises a liquid.

5. A device for indicating the progression of a sheet of paper around a platen comprising means defining a closed helical track having an annular extent substantially in excess of 360 degrees, said track being carried by and normally rotating with said platen, a flowable substance confined and retained by said track defining means in a portion of said track and visible from the exterior of the device, said flowable substance filling more than 180 degrees and less than 360 degrees of the annular extent of said track, and a scale on said device adjacent said track indicating the angular progression of said track relative to said flowable substance and, therefore, the progression of said sheet of paper around said platen.

References Cited

UNITED STATES PATENTS

| | | | |
|---|---|---|---|
| 527,943 | 10/1894 | Clark | 235—68 |
| 982,901 | 1/1911 | Thompson et al. | 235—68 |
| 1,444,444 | 2/1923 | Babcock | 33—206 |
| 2,142,124 | 1/1939 | Gardner | 33—70 |
| 2,505,769 | 5/1950 | Hassell | 197—189 |
| 2,524,571 | 10/1950 | Pilzer | 197—141 |
| 2,633,969 | 4/1953 | Unterweiser | 197—189 |
| 2,690,829 | 10/1954 | Schlick | 197—189 |

FOREIGN PATENTS

| | | |
|---|---|---|
| 414,714 | 8/1934 | Great Britain. |

ROBERT E. PULFREY, *Primary Examiner.*

E. S. BURR, *Assistant Examiner.*